(12) United States Patent
Reichert

(10) Patent No.: US 12,552,357 B2
(45) Date of Patent: Feb. 17, 2026

(54) METHOD AND CONTROL DEVICE FOR CONTROLLING A PARKING BRAKE FOR A VEHICLE, AND PARKING BRAKE SYSTEM FOR A VEHICLE

(71) Applicant: Knorr-Bremse Systeme Fuer Nutzfahrzeuge GmbH, Munich (DE)

(72) Inventor: Matthias Reichert, Hemmingen (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 549 days.

(21) Appl. No.: 17/294,663

(22) PCT Filed: Oct. 25, 2019

(86) PCT No.: PCT/EP2019/079307
§ 371 (c)(1),
(2) Date: May 17, 2021

(87) PCT Pub. No.: WO2020/104138
PCT Pub. Date: May 28, 2020

(65) Prior Publication Data
US 2021/0402970 A1    Dec. 30, 2021

(30) Foreign Application Priority Data
Nov. 19, 2018 (DE) .................. 10 2018 128 946.4

(51) Int. Cl.
*B60T 13/74* (2006.01)
*B60T 7/10* (2006.01)
(Continued)

(52) U.S. Cl.
CPC .............. *B60T 13/74* (2013.01); *B60T 7/107* (2013.01); *B60T 8/885* (2013.01); *B60T 17/221* (2013.01)

(58) Field of Classification Search
None
See application file for complete search history.

(56) References Cited

U.S. PATENT DOCUMENTS 3,771,463 A * 11/1973 Smoot .............. B61L 3/08
                                                        104/297
5,707,121 A    1/1998 Harris et al.
(Continued)

FOREIGN PATENT DOCUMENTS

CN    101939199 A    1/2011
CN    106660538 A    5/2017
(Continued)

OTHER PUBLICATIONS

Lv , "Novel control algorithm of braking energy regeneration system for an electric vehicle during safety-critical driving maneuvers", Energy Conversion and Management, vol. 106, 2015 (Year: 2015).*

(Continued)

*Primary Examiner* — Vivek D Koppikar
*Assistant Examiner* — Kai Nmn Wang
(74) *Attorney, Agent, or Firm* — NORTON ROSE FULBRIGHT US LLP

(57) ABSTRACT

A method for controlling a parking brake for a vehicle, including: reading in a request signal which represents a requested activation of the parking brake, and travel data of the vehicle, wherein the parking brake has at least one spring mechanism and is assigned to at least one axle of the vehicle; and generating an activation signal, for activating the parking brake, using the request signal and the travel data, wherein the activation signal brings about pulsed activation of the parking brake for an adjustable time period, to control (Continued)

the parking brake. Also described are a related control apparatus, a parking brake apparatus, and a computer readable medium.

11 Claims, 2 Drawing Sheets

(51) Int. Cl.
*B60T 8/88* (2006.01)
*B60T 17/22* (2006.01)

(56) References Cited

U.S. PATENT DOCUMENTS

| | | | |
|---|---|---|---|
| 5,775,785 A * | 7/1998 | Harris | B60T 8/173 |
| | | | 303/174 |
| 6,084,508 A * | 7/2000 | Mai | B60T 7/22 |
| | | | 340/436 |
| 6,595,601 B2 * | 7/2003 | Sauter | B60T 8/1755 |
| | | | 303/146 |
| 8,165,768 B2 * | 4/2012 | Leschuk | B60T 13/662 |
| | | | 701/80 |
| 8,500,216 B2 * | 8/2013 | Bensch | B60T 13/662 |
| | | | 303/115.2 |
| 8,512,208 B2 | 8/2013 | Hilberer | |
| 10,046,793 B2 * | 8/2018 | Green | B62D 15/025 |
| 10,124,775 B2 * | 11/2018 | Svensson | B60T 7/22 |
| 10,179,577 B2 * | 1/2019 | Kappes | B60T 7/12 |
| 2002/0135228 A1 | 9/2002 | Sauter et al. | |
| 2006/0232126 A1 * | 10/2006 | Giers | B60T 13/74 |
| | | | 303/113.1 |
| 2010/0252378 A1 | 10/2010 | Hilberer | |
| 2016/0313733 A1 * | 10/2016 | Bellem | B60N 2/02 |
| 2017/0120910 A1 * | 5/2017 | Schubert | B60W 30/143 |
| 2019/0248349 A1 | 8/2019 | Wulf | |
| 2019/0248350 A1 | 8/2019 | Wulf | |
| 2021/0402970 A1 * | 12/2021 | Reichert | B60T 8/885 |

FOREIGN PATENT DOCUMENTS

| | | |
|---|---|---|
| DE | 10064508 A1 | 7/2001 |
| DE | 10251249 A1 | 12/2003 |
| DE | 102007004758 A1 | 8/2008 |
| DE | 102008009882 A1 | 8/2009 |
| DE | 102013005896 A1 | 10/2014 |
| JP | H09-501126 A | 2/1997 |
| JP | 2003-519047 A | 6/2003 |
| JP | H-11217073 A * | 5/2004 |
| JP | H-11270378 A * | 1/2005 |
| JP | 2006-509680 A | 3/2006 |
| JP | 2011512292 A | 4/2011 |
| WO | 2004054862 A1 | 7/2004 |

OTHER PUBLICATIONS

Wang, "robust wheel slip ratio control design combining hydraulic and regenerative braking systems for in-wheel-motors-driven electric Vehicles", Journal of the Franklin Institute, vol. 352, Issue 2, 2015 (Year: 2015).*

International Search Report for PCT/EP2019/079307 Issued Feb. 6, 2020.

* cited by examiner

METHOD AND CONTROL DEVICE FOR CONTROLLING A PARKING BRAKE FOR A VEHICLE, AND PARKING BRAKE SYSTEM FOR A VEHICLE

FIELD OF THE INVENTION

The present invention relates to a method for controlling a parking brake for a vehicle, to a corresponding control device and to a parking brake system for a vehicle.

BACKGROUND INFORMATION

When there is an electronic parking brake (EPB) in a vehicle, activation can occur during travel. However, such a parking brake can conventionally only react with a feedback of wheel speeds to locking of the wheels and reduce a braking force in a suitable way by venting spring mechanisms.

SUMMARY OF THE INVENTION

Against this background, an object of the present invention is to provide an improved method for controlling a parking brake for a vehicle, an improved control device and an improved parking brake system for a vehicle.

This object may be achieved by a method for controlling a parking brake for a vehicle, by a corresponding control device, by a parking brake system for a vehicle and by a corresponding computer program according to the main description herein.

According to embodiments, a braking force can be reduced intermittently in particular in the case of unintentional requesting of an activation of a parking brake of a vehicle, in order to counteract, through such pulsing or pulsed activation, the locking of at least one axle which is equipped for the parking brake with a spring mechanism, and to increase the possibility of lateral guidance of such an axle. This pulsing can be implemented, in particular, by a function of the parking brake at regular intervals, for example in accordance with the speed, and additionally or alternatively in accordance with the activation.

According to embodiments, in particular when there is an electronic parking brake of a vehicle, undesired braking with the parking brake during travel can advantageously be avoided. Therefore, risks can be minimized when deceleration with the parking brake during travel of the vehicle by pulsing a brake pressure of the parking brake relationship second parking brake. For example, when there is incorrect information from an activation device (HCU, Hand Control Unit) to the parking brake, wherein an incorrect braking request may be present in the valid range, pulsing or pulsed activation can be used to prevent the vehicle from surprisingly and undesirably being decelerated by the parking brake and affected wheels from locking and the vehicle becoming unstable. Therefore, stability of the vehicle can be maintained or increased even when there is an incorrect request for activation of the parking brake. In addition, the driver can be haptically warned by the pulsing of the braking force.

A method for controlling a parking brake for a vehicle is presented, wherein the parking brake has at least one spring mechanism and is assigned to at least one axle of the vehicle, wherein the method has the following steps:

reading in a request signal which represents a requested activation of the parking brake, and travel data of the vehicle; and generating an activation signal for activating the parking brake using the request signal and the travel data, where the activation signal brings about pulsed activation of the parking brake for an adjustable time period, in order to control the parking brake.

The method and the steps of the method can be carried out using a control device. The vehicle may be a utility vehicle, such as for example a truck or the like. The travel data can represent a speed, a cargo, an acceleration, a slip value of wheels of the vehicle on the roadway and additionally or alternatively further static or dynamic parameters.

According to one embodiment, in the generating step the activation signal which brings about the pulsed activation of the parking brake for the adjustable time period is generated if the travel data indicates a movement of the vehicle. Such an embodiment provides the advantage that the safety and stability of the vehicle can be increased in particular even when there is an unintentional activation request of the parking brake during travel.

Also, in the generating step the adjustable time period is adjusted in accordance with a level of the request signal and additionally or alternatively in accordance with the travel data. In this context, the level of the request signal can represent a deflection of an activation device which makes available the request signal. Such an embodiment provides the advantage that the time period during which the parking brake is activated in a pulsed manner can be selected in a situation-dependent manner and according to demand, in order to improve the safety and stability of the vehicle.

In addition, in the generating step an activation signal can be generated which brings about permanent activation of the parking brake as a function of the request signal after the expiry of the adjustable time period. In this context, the request signal can represent an activation which is still requested. Permanent activation can represent complete venting of the at least one fault memory and additionally or alternatively activation up to a stationary state of the vehicle or up to the point where an abort criterion of the activation of the parking brake is reached. Such an embodiment provides the advantage that after the haptic warning by the pulsed activation when there is still a request signal, braking by the parking brake can be initiated and executed. Therefore, it is still possible to satisfy the braking request if the possibility, offered during the adjustable time period, of correcting an operated control operation of the activation device which outputs the request signal has passed without being used.

In particular, in the generating step an activation signal is generated which controls the brake pressure of the at least one spring mechanism of the parking brake in accordance with the request signal and additionally or alternatively in accordance with the travel data. The brake pressure of the at least one fault memory can have a high-pressure value when the parking brake is not activated and a low-pressure value when the parking brake is activated or at least partially activated. Such an embodiment provides the advantage that a brake pressure can be adjusted in a situation-dependent manner and according to demand, in order to increase the safety and stability of the vehicle.

In this context, in the generating step an activation signal is generated which changes the brake pressure from a first level, which represents an inactivated parking brake, to a second level, which lies above a pressure threshold value at which wheels of the vehicle lock, which signal permits the brake pressure to fluctuate about the second level for the adjustable time period as a result of the pulsing, and changes, after the expiry of the adjustable time period, to a third level which represents a permanently and additionally or alternatively completely activated parking brake. Such an embodiment provides the advantage that the pulsed activation can be implemented by a process of controlling the brake pressure which is not costly to monitor.

In addition, in the reading in step the request signal can be read in from an interface with a manual activation device of the vehicle. The interface can be an input interface. The input interface can be part of a control device for carrying out the method or part of the operator control device or can be embodied as an intermediate unit. The activation device can also be referred to as an operator control device. The activation device can have a lever, at least one switch, at least one pushbutton key or an operator control panel as a user interface. The operator control device can be activated by a driver of the vehicle. Such an embodiment provides the advantage that an unintentional activation request can be reliably detected, and checking can be made possible by haptic feedback.

The method can also have a step of outputting the activation signal to an interface with the parking brake. The interface for the parking brake can also be referred to as an output interface. The output interface can be part of a control device for carrying out the method or part of the parking brake or be embodied as an intermediate unit. Such an embodiment provides the advantage that a brake pressure of the parking brake can be controlled in a simple and reliable way.

The approach presented here also provides a control device which is configured to execute, actuate and/or implement the steps of the variants of a method presented here, in corresponding devices. This embodiment variant of the invention in the form of a control device can also quickly and efficiently achieve the object on which the invention is based.

For this purpose, the control device can have at least one computing unit for processing signals or data, at least one memory unit for storing signals or data, at least one interface with a sensor or an actuator for reading in sensor signals from the sensor or for outputting control signals to the actuator and/or at least one communication interface for reading in or outputting data which is embodied in a communication protocol. The computing unit can be, for example, a signal processor, a microcontroller or the like, wherein the memory unit is a flash memory, an EEPROM or a magnetic memory unit. The communication interface can be configured to read in or output data in a wireless and/or wired manner, wherein a communication interface can read in or output the line-bound data, read in this data, for example, electrically or optically from a corresponding data transmission line or output said data into a corresponding data transmission line.

A control device can be understood here to be an electrical device which processes sensor signals, and outputs control signals and/or data signals in accordance therewith. The control device can have an interface which can be embodied by hardware and/or software. In a hardware embodiment, the interfaces may be, for example, part of what is referred to as a system ASIC which includes a wide variety of functions of the control device. However, it is also possible for the interfaces to be separate integrated circuits or to be composed at least partially of discrete components. In the case of a software embodiment, the interfaces can be software modules which are present, for example, on a microcontroller alongside other software modules.

A parking brake system is also presented for a vehicle, wherein the parking brake system has the following features:

a parking brake, wherein the parking brake has at least one spring mechanism and is assigned to at least one axle of the vehicle; and an embodiment of the control device mentioned above, wherein the control device is connected in a way which is enabled for the transition of signals to the parking brake.

One embodiment of the control device mentioned above can be advantageously employed or used in conjunction with the parking brake system in order to control the parking brake. In addition, the parking brake system can have a manual activation device. The control device can be connected in a way which is enabled for the transmission of signals to the activation device.

A computer program product or computer program with program code which can be stored on a machine-readable carrier or storage medium such as a semiconductor memory, a hard disk memory or an optical memory and is used to execute, implement and/or actuate the steps of the method according to one of the embodiments described above, in particular when the program product or program is run on a computer or a device, is also advantageous.

Exemplary embodiments of the approach presented here are explained in more detail in the following description with reference to the figures.

DETAILED DESCRIPTION

Figure 1:
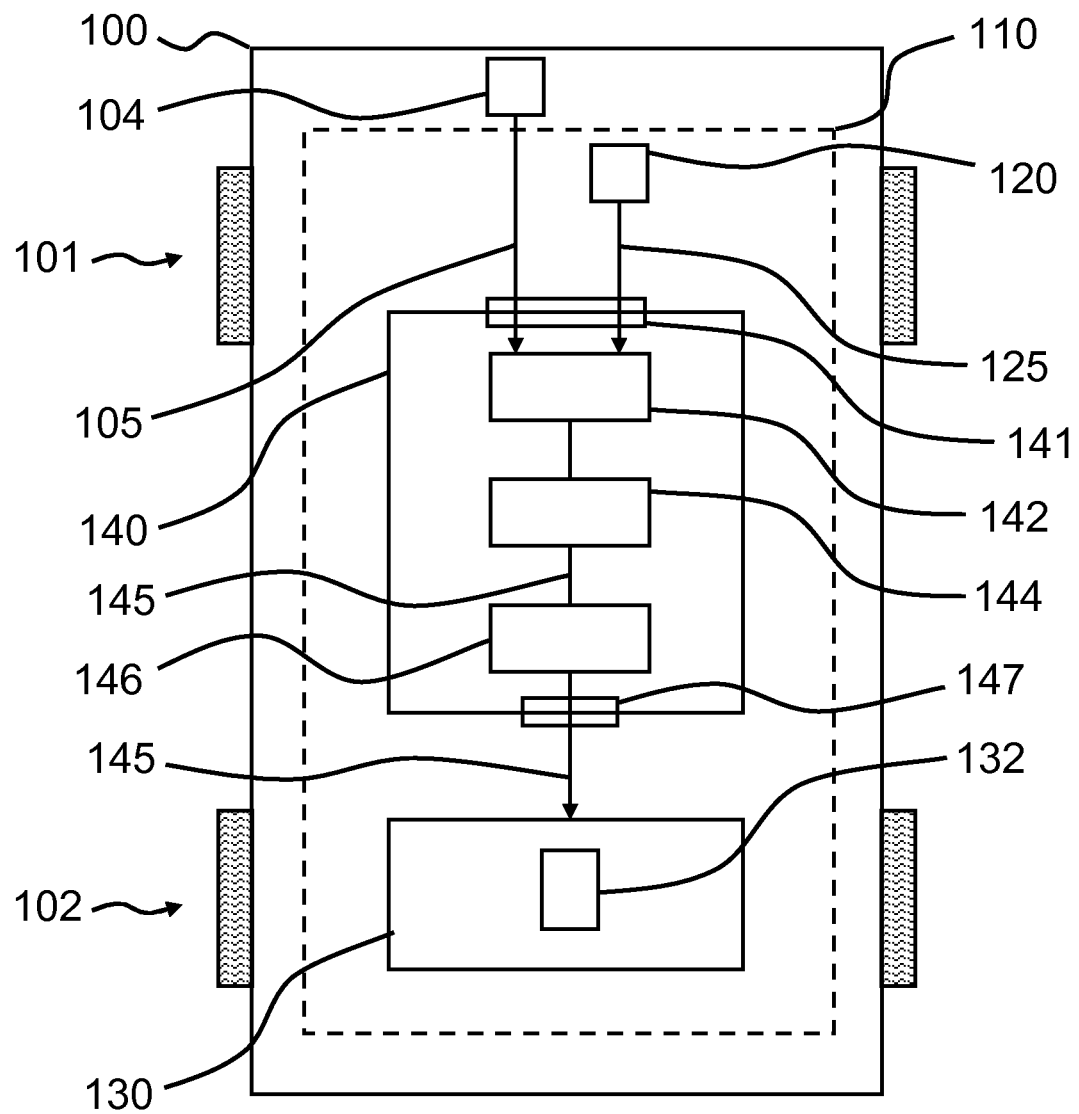
FIG. 1 shows a schematic illustration of a vehicle having a parking brake system according to an exemplary embodiment.

FIG. 1 shows a schematic illustration of a vehicle 100 with a parking brake system 110 according to an exemplary embodiment. The vehicle 100 is a motor vehicle, for example a utility vehicle, in particular a truck or the like.

The illustration in FIG. 1 shows the parking brake system 110, a first axle 101, a second axle 102 and a travel data sensor 104 of the vehicle 100. The vehicle 100 therefore has the first axle 101, the second axle 102, the travel data sensor 104 and the parking brake system 110. The travel data sensor 102 is configured to acquire operating parameters of the vehicle 100 and make them available in the form of travel data 105. The travel data 105 represent a speed, a cargo, an acceleration, a slip value of wheels of the vehicle 100 on a roadway and additionally or alternatively further static or dynamic operating parameters. The travel data sensor 102 is connected in a way which is enabled for the transmission of signals to the parking brake system 110.

The parking brake system 110 has a parking brake 130 with at least one spring mechanism 132, a control device 140 and, according to the exemplary embodiment illustrated here, a manual activation device 120 or operator control device. The parking brake 130 is assigned to the second axle 102 of the vehicle 100. The parking brake 130 has at least one spring mechanism 132. The control device 140 is connected in a way which is enabled for the transmission of signals to the parking brake 130.

In addition, the control device 140 is connected in a way which is enabled for the transmission of signals to the activation device 120. The activation device 120 has a lever, at least one switch, at least one pushbutton key or an operator control panel as a user interface. The activation device 120 is configured to provide a request signal 125 in response to an operator control operation of the activation device 120 by a user. The request signal 125 represents a requested activation of the parking brake 130 or an activation request relating to the parking brake 130. In addition, the control device 140 is connected in a way which is enabled for the transmission of signals to the travel data sensor 104.

The control device 140 is configured to control the parking brake 130. In particular, the control device 140 is configured to regulate a brake pressure in the at least one spring mechanism 132 in order to control the parking brake 130. The control device 140 has a reading device 142 and a generating device 144. According to one exemplary embodiment, the control device 140 also has an output device 146 and an input interface 141 and an output interface 147.

The reading device 142 is configured to read in the request signal 125 and the travel data 105. According to one exemplary embodiment, the reading device 142 is configured to read in the request signal 125 from the input interface 141. The input interface 141 represents an interface with the manual activation device 120. In other words, the reading device 142 is configured here to read in the request signal 125 from the activation device 120 via the input interface 141. In addition, the reading device 142 is configured to read in the travel data 105 from the travel data sensor 104 via the input interface 141. The reading device 142 and the generating device 144 are connected to one another in a way which is enabled for the transmission of signals.

The generating device 144 is configured to use the request signal 125 and the travel data 105 to generate an activation signal 145 for activating the parking brake 130. The activation signal 145 which is generated by the generating device 144 brings about pulsed activation of the parking brake 130 for an adjustable time period, in order to control the parking brake 130. According to one exemplary embodiment, the generating device 144 is connected in a way which is enabled for the transmission of signals to the output device 146.

The output device 146 which is provided according to one exemplary embodiment is configured to output the activation signal 145 generated by the generating device 144 to the output interface 147. The output interface 147 represents an interface with the parking brake 130. The output device 146 is therefore configured to output the activation signal 145 to the parking brake 130 via the output interface 147.

According to one exemplary embodiment, the generating device 144 is configured to generate the activation signal 145 if the travel data 105 represent a movement of the vehicle 100 or indicate such a movement. According to one exemplary embodiment, the generating device 144 is also configured to adjust the adjustable time period in accordance with the request signal 125 and/or in accordance with the travel data 105. To be more precise, in this context the generating device 144 is configured to adjust the adjustable time period in accordance with a level or signal level of the request signal 125 and/or in accordance with the travel data 105 and/or information, represented by the travel data 105, about parameters of the vehicle 100. In addition, according to one exemplary embodiment, the generating device 144 is configured to generate an activation signal 145 which brings about permanent activation of the parking brake 130 in accordance with the request signal 125 after the expiry of the adjustable time period. In this context, the permanent activation represents activation of the parking brake 130 for a predefinable time period without pulsing.

To be more precise, in accordance with one exemplary embodiment the generating device 144 is configured to generate an activation signal 145 which controls a brake pressure of the at least one spring mechanism 132 of the parking brake 130 in accordance with the request signal 125 and/or in accordance with the travel data 105 and/or brings about regulation of the brake pressure in accordance with the activation signal 125 and/or in accordance with the travel data 105. In this context, the generating device 144 is, in particular, configured to generate an activation signal 145 which changes the brake pressure from a first level, which represents an inactivated parking brake, to a second level, which lies above a pressure threshold value at which wheels of the vehicle 100 lock, which signal permits fluctuation about the second level for the adjustable time period as a result of the pulsing, and changes, after the expiry of the adjustable time period, to a third level which represents a permanently activated and/or completely activated parking brake 130.

Figure 2:
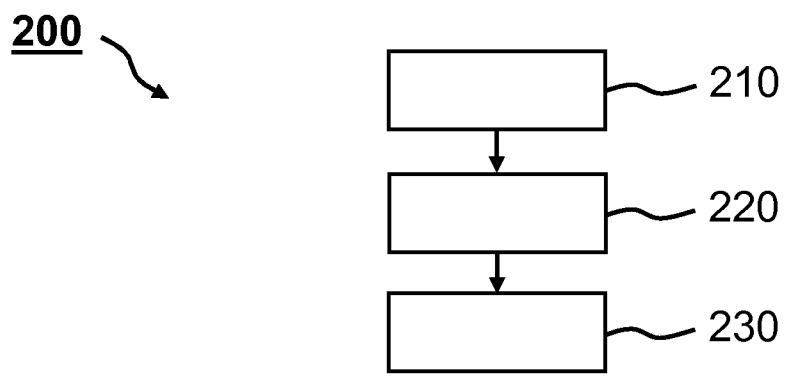
FIG. 2 shows a flow diagram of a method for controlling according to the exemplary embodiment.

FIG. 2 shows a flow diagram of a control method 200 according to an exemplary embodiment. The control method 200 can be carried out in order to control a parking brake for a vehicle and/or control the operation thereof. To be more precise, the control method 200 can be carried out in conjunction with the parking brake system from FIG. 1 or a similar parking brake system. In this context, the control method 200 can be carried out in order to control the parking brake from FIG. 1 or a similar parking brake. In this context, the control method 200 can be carried out by the control device from FIG. 1 or a similar control device.

In a reading in step 210, in the control method 200 a request signal, which represents a requested activation of the parking brake, and travel data of the vehicle are read in. Subsequently, in a generating step 220 an activation signal for activating the parking brake is generated using the request signal and the travel data. The activation signal which is generated in the generating step 220 brings about pulsed activation of the parking brake for an adjustable time period, in order to control the parking brake.

According to one exemplary embodiment, the activation signal which is generated in the generating step 220 is subsequently output to an interface with the parking brake in an outputting step 230.

Figure 3:
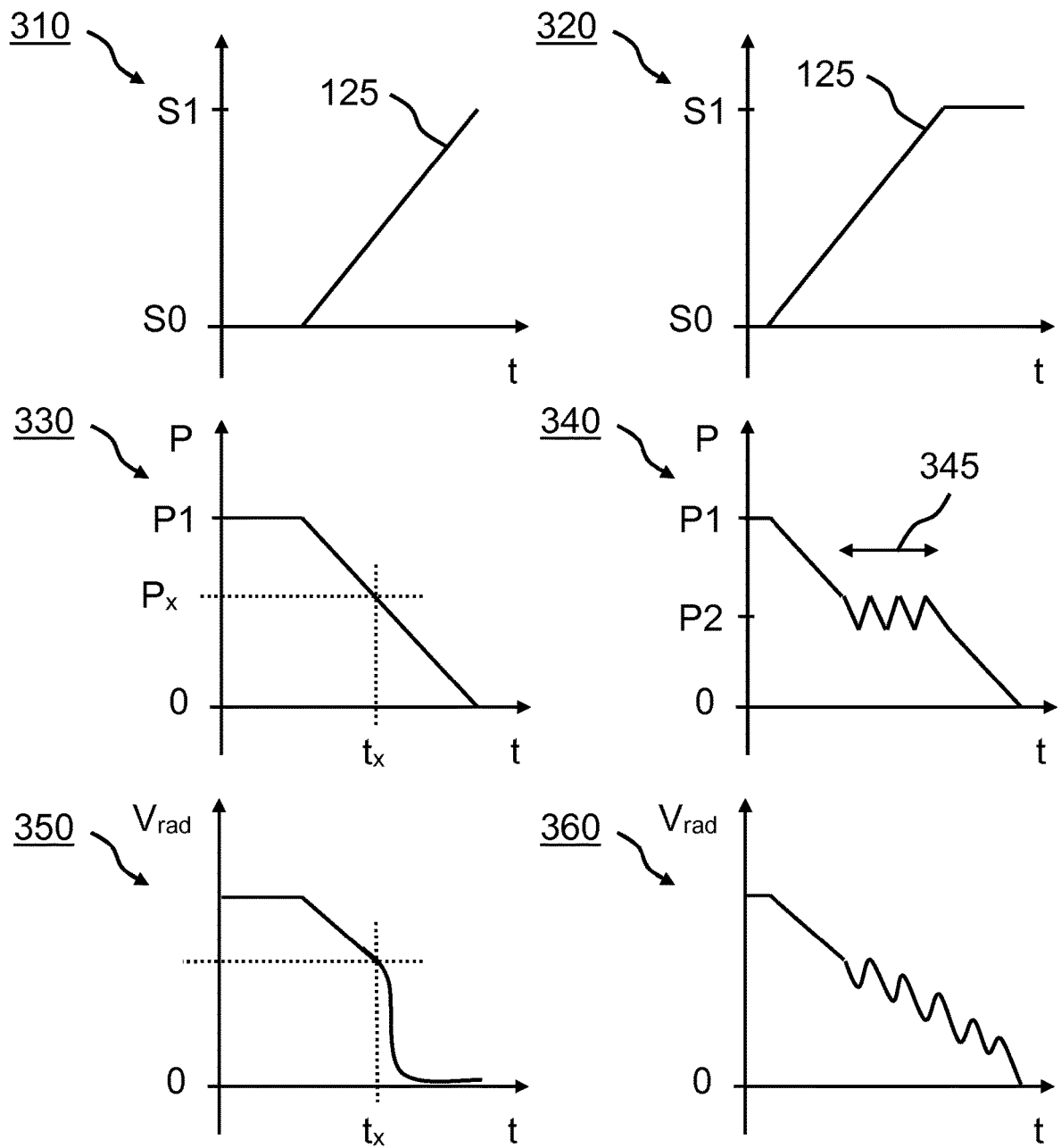
FIG. 3 shows schematic diagrams relating to the operation and method of functioning of the parking brake system from FIG. 1.

FIG. 3 shows schematic diagrams 310, 320, 330, 340, 350 and 360 relating to the operation and method functioning of the parking brake system from FIG. 1. Here, a first switched position/time diagram 310, a first brake pressure/time diagram 330 and a first wheel speed/time diagram 350 relate to a situation in which the control device of the parking brake system from FIG. 1 passes on request signals 125 directly to the parking brake. In this context, a wheel of the vehicle can lock starting from a critical brake pressure. In contrast, a second switched position/time diagram 320, a second brake pressure/time diagram 340 and a second wheel speed/time diagram 360 relates to a situation in which the control device of the parking brake system from FIG. 1 brings about, in response to request signals 125, at least temporarily a pulsed activation of the parking brake, as a result of which the brake pressure of the parking brake is also pulsed, in order to prevent locking of wheels of the vehicle.

In the first switched position/time diagram 310 and in the second switched position/time diagram 320, the time t is plotted on the abscissa axis and a switched position of the manual activation device of the parking brake system is plotted on the ordinate axis. The graphs in the first switched position/time diagram 310 and in the second switched position/time diagram 320 each represent the request signal 125 of the parking brake system from FIG. 1. In this context, the request signal 122 rises in the first switched position/time diagram 310, and in the second switched position/time diagram 320 it rises from a first signal level, which corresponds to a neutral position S0 of the activation device, to a second signal level which corresponds to an active position S1 of the activation device. This rise is in particular a linear rise and corresponds to an activation movement or operator control movement from the neutral position S0 into the active position S1, which movement is performed on the manual activation device.

In the first brake pressure/time diagram 330 and in the second brake pressure/time diagram 340, the time t is respectively plotted on the abscissa axis, and the brake pressure P which is applied to the parking brake or the spring mechanism of the parking brake system or a brake pressure P which is brought about by the activation signal from FIG. 1 is plotted on the ordinate axis. In the first brake pressure/time diagram 330, a first level P1 of the brake pressure is entered. The first level P1 of the brake pressure represents an unactivated state of the parking brake. The first level P1 of the brake pressure P1 is, for example, 8.5 bar or the like. The brake pressure P during the rise of the request signal 125 has a drop, here particularly a linear drop, from the first level P1 to a brake pressure of 0. A brake pressure of 0 represents a completely activated state of the parking brake. Starting from where a critical brake pressure $P_x$ is undershot between the first level P1 and a brake pressure of 0, locking of at least one wheel of the vehicle can occur. This critical brake pressure $P_x$ occurs at a critical point in time $t_x$.

In the second brake pressure/time diagram 340, the first level P1 of the brake pressure and a second level P2 of the brake pressure are entered. The brake pressure P has here a drop, in particular a linear drop, from the first level P1 to the second level P2 during a first part of the rise of the request signal 125. The second level P2 of the brake pressure represents a partially activated state of the parking brake. During a second part of the rise of the request signal 125, the brake pressure P has fluctuations about the second level P2. The fluctuations of the brake pressure P about the second level P2 of the brake pressure occur for the adjustable time period 345. Subsequently, the brake pressure P drops from the second level P2 to a brake pressure of 0. Therefore, in the second brake pressure/time diagram 340 firstly a reduction in the brake pressure P occurs owing to the pulsed activation by the control device, in a way similar to that in the first brake pressure/time diagram 330, followed by a pulsing up to the expiry of the adjustable time period 345, and finally a further reduction occurs in the brake pressure P for the engagement of the parking brake. The pressure graph in the second brake pressure/time diagram 340 therefore has a sawtooth profile during the adjustable time period, bordered by two linear dropping edges.

In the first wheel speed/time diagram 350 and in the second wheel speed/time diagram 360, the time t is respectively plotted on the abscissa axis, and a wheel speed $V_{rad}$ of a wheel of the vehicle is plotted on the ordinate axis. In the first wheel speed/time diagram 350, the wheel speed $V_{rad}$ firstly has, during the rise of the request signal 125 and the dropping of the brake pressure P, a first drop, in particular a linear drop, with a small gradient which is followed by a second drop with a large gradient starting from the critical point in time $t_x$. The large gradient corresponds here to locking of at least one wheel of the vehicle. In the second wheel speed/time diagram 360, the wheel speed $V_{rad}$ firstly has a first drop which corresponds to the first drop of the wheel speed $V_{rad}$ from the first wheel speed/time diagram 350 or is similar to it. During the adjustable time period 345, the wheel speed $V_{rad}$ has a second drop in the wheel speed $V_{rad}$ to 0, wherein the second drop occurs discontinuously in wave movements, in order to prevent locking of at least one wheel of the vehicle.

THE LIST OF REFERENCE SYMBOLS IS AS FOLLOWS

100 vehicle
101 first axle
102 second axle
104 travel data sensor
105 travel data
110 parking brake system
120 manual activation device or operator control device
125 request signal
130 parking brake
132 spring mechanism
140 control device
141 input interface
142 reading device
144 generating device
145 activation signal
146 output device
147 output interface
200 control method
210 reading in step
220 generating step
230 outputting step
310 first switched position/time diagram
S0 neutral position of the activation device
S1 active position of the activation device
t time
320 second switched position/time diagram
330 first brake pressure/time diagram
P brake pressure of the parking brake
P1 first level of the brake pressure
340 second brake pressure/time diagram
345 adjustable time period
P2 second level of the brake pressure
350 first wheel speed/time diagram
$V_{rad}$ wheel speed
360 second wheel speed/time diagram

The invention claimed is:

1. A method for controlling a parking brake for a vehicle, the method comprising:
   reading in a request signal which represents a requested activation of the parking brake, and travel data of the vehicle, wherein the parking brake has at least one spring mechanism and is assigned to at least one axle of the vehicle; and
   generating, via a generating device of a control device, an activation signal, for activating the parking brake, using the request signal and the travel data, wherein the activation signal causes pulsed activation of the parking brake, for an adjustable time period, to control the parking brake;
   wherein the activation signal causes, on expiration of the adjustable time period, a permanent activation of the parking brake as a function of the request signal,
   wherein a travel data sensor is configured to acquire operating parameters of the vehicle and provide them as the travel data, including at least one of: a speed, a cargo, an acceleration, and a slip value of a wheel of the vehicle on a roadway, and wherein the generating device is configured to adjust the adjustable time period in accordance with the request signal and in accordance with the travel data; wherein in the generating, the activation signal is generated which controls a brake pressure of the at least one spring mechanism of the parking brake in accordance with the request signal and/or in accordance with the travel data; wherein in the generating, the activation signal is generated which changes the brake pressure from a first level, in which the parking brake is inactivated, to a second level, which lies above a pressure threshold value at which wheels of the vehicle lock, which signal permits the brake pressure to fluctuate about the second level for the adjustable time period as a result of the pulsing, and changes, after the adjustable time period expires, to a third level in which the parking brake is activated.

2. The method of claim 1, wherein in the generating, the activation signal which brings about the pulsed activation of the parking brake for the adjustable time period is generated if the travel data indicates a movement of the vehicle.

3. The method of claim 1, wherein in the generating, the adjustable time period is adjusted in accordance with a level of the request signal and/or in accordance with the travel data.

4. The method of claim 1, wherein in the generating, the activation signal is generated to permanently activate the parking brake as a function of the request signal after the adjustable time period expires.

5. The method of claim 1, wherein in the reading in, the request signal is read in from an interface to a manual activation device of the vehicle.

6. The method of claim 1, further comprising:
outputting the activation signal to an interface with the parking brake.

7. A control apparatus for controlling a parking brake for a vehicle, comprising:
a control device configured to perform the following:
reading in a request signal which represents a requested activation of the parking brake, and travel data of the vehicle, wherein the parking brake has at least one spring mechanism and is assigned to at least one axle of the vehicle; and
generating, via a generating device of the control device, an activation signal, for activating the parking brake, using the request signal and the travel data, wherein the activation signal causes pulsed activation of the parking brake, for an adjustable time period, to control the parking brake;
wherein the activation signal causes, on expiration of the adjustable time period, a permanent activation of the parking brake as a function of the request signal,
wherein a travel data sensor is configured to acquire operating parameters of the vehicle and provide them as the travel data, including at least one of: a speed, a cargo, an acceleration, and a slip value of a wheel of the vehicle on a roadway, and
wherein the generating device is configured to adjust the adjustable time period in accordance with the request signal and in accordance with the travel data; wherein in the generating, the activation signal is generated which controls a brake pressure of the at least one spring mechanism of the parking brake in accordance with the request signal and/or in accordance with the travel data; wherein in the generating, the activation signal is generated which changes the brake pressure from a first level, in which the parking brake is inactivated, to a second level, which lies above a pressure threshold value at which wheels of the vehicle lock, which signal permits the brake pressure to fluctuate about the second level for the adjustable time period as a result of the pulsing, and changes, after the adjustable time period expires, to a third level in which the parking brake is activated.

8. A parking brake apparatus for a vehicle, comprising:
a parking brake system, including:
a parking brake, wherein the parking brake has at least one spring mechanism and is assigned to at least one axle of the vehicle; and
a control device connected so as to be enabled for transition of signals to the parking brake;
wherein the control device is configured to perform the following:
reading in a request signal which represents a requested activation of the parking brake, and travel data of the vehicle, wherein the parking brake has at least one spring mechanism and is assigned to at least one axle of the vehicle; and
generating, via a generating device of the control device, an activation signal, for activating the parking brake, using the request signal and the travel data, wherein the activation signal causes pulsed activation of the parking brake, for an adjustable time period, to control the parking brake;
wherein the activation signal causes, on expiration of the adjustable time period, a permanent activation of the parking brake as a function of the request signal,
wherein a travel data sensor is configured to acquire operating parameters of the vehicle and provide them as the travel data, including at least one of: a speed, a cargo, an acceleration, and a slip value of a wheel of the vehicle on a roadway, and
wherein the generating device is configured to adjust the adjustable time period in accordance with the request signal and in accordance with the travel data; wherein in the generating, the activation signal is generated which controls a brake pressure of the at least one spring mechanism of the parking brake in accordance with the request signal and/or in accordance with the travel data; wherein in the generating, the activation signal is generated which changes the brake pressure from a first level, in which the parking brake is inactivated, to a second level, which lies above a pressure threshold value at which wheels of the vehicle lock, which signal permits the brake pressure to fluctuate about the second level for the adjustable time period as a result of the pulsing, and changes, after the adjustable time period expires, to a third level in which the parking brake is activated.

9. A non-transitory computer readable medium having a computer program, which is executable by a processor of a control device, comprising:
a program code arrangement having program code for controlling, via the control device, a parking brake for a vehicle, by performing the following:
reading in a request signal which represents a requested activation of the parking brake, and travel data of the vehicle, wherein the parking brake has at least one spring mechanism and is assigned to at least one axle of the vehicle; and generating, via a generating device of the control device, an activation signal, for activating the parking brake, using the request signal and the travel data, wherein the activation signal causes pulsed activation of the parking brake, for an adjustable time period, to control the parking brake;

wherein the activation signal causes, on expiration of the adjustable time period, a permanent activation of the parking brake as a function of the request signal, wherein a travel data sensor is configured to acquire operating parameters of the vehicle and provide them as the travel data, including at least one of: a speed, a cargo, an acceleration, and a slip value of a wheel of the vehicle on a roadway, and wherein the generating device is configured to adjust the adjustable time period in accordance with the request signal and in accordance with the travel data; wherein in the generating, the activation signal is generated which controls a brake pressure of the at least one spring mechanism of the parking brake in accordance with the request signal and/or in accordance with the travel data; wherein in the generating, the activation signal is generated which changes the brake pressure from a first level, in which the parking brake is inactivated, to a second level, which lies above a pressure threshold value at which wheels of the vehicle lock, which signal permits the brake pressure to fluctuate about the second level for the adjustable time period as a result of the pulsing, and changes, after the adjustable time period expires, to a third level in which the parking brake is activated.

10. The method of claim 1, wherein the travel data includes a speed, an acceleration, and a slip value.

11. The method of claim 1, wherein during the adjustable time period, a brake pressure/time diagram has a sawtooth profile that is bordered by two linear dropping edges.

* * * * *